S. DUNFEE.
Belt and Pulley-Gearings.

No. 150,655. Patented May 5, 1874.

Witnesses.
E. A. Bates.
Phil. C. Masi.

Inventor.
Samuel Dunfee.
Chipman Hosmer & Co
Attys

UNITED STATES PATENT OFFICE.

SAMUEL DUNFEE, OF JOHNSTOWN, PENNSYLVANIA.

IMPROVEMENT IN BELT-AND-PULLEY GEARINGS.

Specification forming part of Letters Patent No. 150,655, dated May 5, 1874; application filed August 30, 1873.

*To all whom it may concern:*

Be it known that I, SAMUEL DUNFEE, of Johnstown, in the county of Cambria and State of Pennsylvania, have invented a new and valuable Improvement in Power-Saving Loose Pulley for Twisted Belts; and I do hereby declare that the following is a full, clear, and exact description of the construction and operation of the same, reference being had to the annexed drawings making a part of this specification, and to the letters and figures of reference marked thereon.

Figure 1:
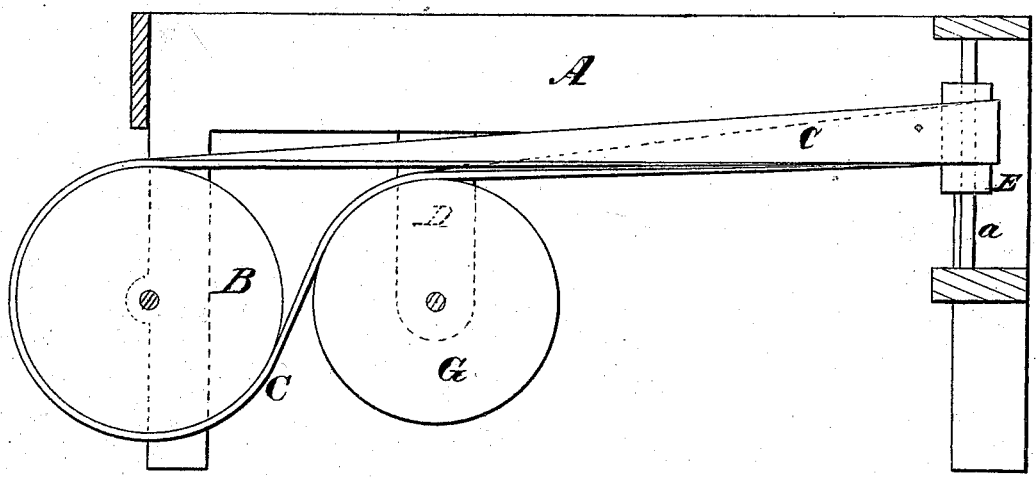
Figure 2:
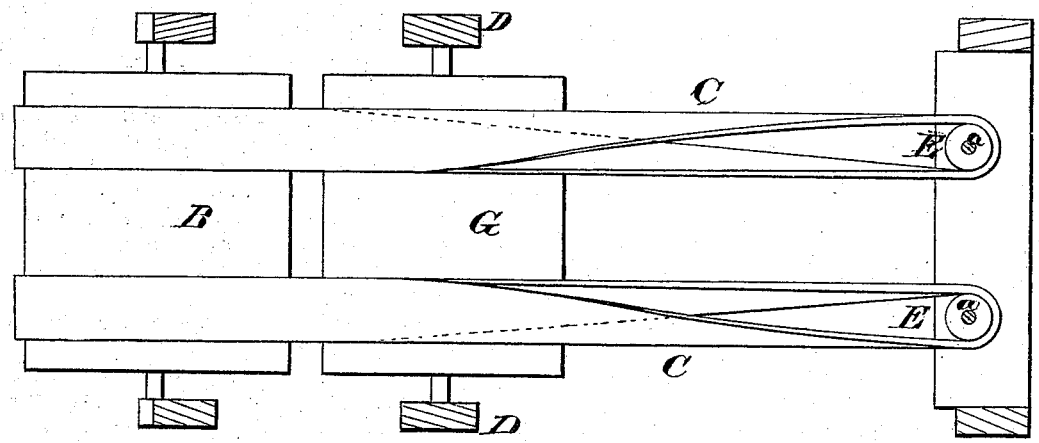

Figure 1 of the drawings is a representation of a vertical longitudinal section of my pulley. Fig. 2 is a horizontal section of same.

This invention relates to an improvement which is applicable to endless twisted belts which are used to transmit motion to pulleys or spindles from a belt-drum whose axis is at right angles to the axes of said pulleys or spindles, as, for instance, in spinning - machines, planers, and other machinery requiring the use of twisted belts.

My object is to bring both upper and lower parts of an endless twisted belt in a direct line with the driven pulley by means of a loose auxiliary drum or pulley, which is so arranged that one portion of the belt plays over it, thereby avoiding friction on the belt and also preventing the same from working off its pulley, as will be hereinafter more fully explained.

This invention consists in placing the upper surface of the horizontal driving-drum in the same plane with the whirls of the vertical spindles, and between said spindles and said driving-drum a horizontal guide-drum of equal, or nearly equal, diameter with the driving-drum, and having its upper surface slightly lower than that of said driving-drum, whereby the upper branch of the belt is brought into the horizontal position, and its lower branch is raised by the guide-drum parallel with said upper branch.

In the accompanying drawings I have represented my improvement applied to the frame of a planer; but it will be obvious, from the following explanation, that the improvement is applicable to all varieties of machinery requiring a twisted belt.

A represents a frame in which twisted belts C are applied for communicating rotary motion from a horizontal drum, B, to pulleys E on vertical spindles *a*. The belts C would naturally be tangent to the circumference of the drum B, which would incline them from the pulleys E, and thus they would be constantly slipping off these pulleys and sliding one part over the other, owing to the twist necessarily given them.

To obviate these and other objections, I employ a loose pulley or drum, G, the journals of which have their bearings, under the arrangement shown, in hangers D D depending from the frame A. This pulley G is adjusted so as to raise the lower portion of the belts C in, or nearly in, the same plane as the upper portion of the belts, which latter extends from the drum B to the pulleys in a plane which is at right angles to them, as shown in Fig. 1. The object of the extra pulley G is, therefore, to lift the lower portion of the belt and keep it in the same plane as the upper portion of the belt.

By this simple and cheap device a great deal of friction is avoided on the belts, as they do not crawl or travel obliquely on the spindle-pulleys, and they, as well as their clasps, wear much longer than they would do without the drum G. I also, as before stated, prevent the belts slipping off or drawing to a disadvantage on their pulleys.

What I claim as new, and desire to secure by Letters Patent, is—

The combination, with the vertical spindle-pulleys E, of the horizontal driving-drum B and the horizontal guide-drum G, of equal or nearly equal diameter, having their upper surfaces in line with said spindle-pulleys, and the independent belts C running directly from the driving-drum to said spindles, and from the latter direct to the horizontal guide-drum, as specified.

In testimony that I claim the above I have hereunto subscribed my name in the presence of two witnesses.

SAMUEL DUNFEE.

Witnesses:
A. MONTGOMERY,
DAVID PEELOR.